(12) United States Patent
Courey, Jr.

(10) Patent No.: US 6,820,129 B1
(45) Date of Patent: Nov. 16, 2004

(54) SYSTEM AND METHOD OF MANAGING NETWORK BUFFERS

(75) Inventor: Charles J. Courey, Jr., Folsum, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 812 days.

(21) Appl. No.: 09/667,385

(22) Filed: Sep. 22, 2000

(51) Int. Cl.$^7$ .................. G06F 15/16; G06F 15/173
(52) U.S. Cl. ............................. 709/234; 709/226
(58) Field of Search ......................... 709/232, 233, 709/234, 235, 250, 226; 358/1.16; 710/56; 370/231, 235

(56) References Cited

U.S. PATENT DOCUMENTS

| | | | | |
|---|---|---|---|---|
| 6,046,817 A | * | 4/2000 | Brown et al. | 358/1.16 |
| 6,070,202 A | * | 5/2000 | Minkoff et al. | 710/56 |
| 6,115,357 A | * | 9/2000 | Packer et al. | 370/231 |
| 6,205,120 B1 | * | 3/2001 | Packer et al. | 370/235 |
| 6,256,674 B1 | * | 7/2001 | Manning et al. | 709/232 |
| 6,347,337 B1 | * | 2/2002 | Shah et al. | 709/232 |
| 6,594,701 B1 | * | 7/2003 | Forin | 709/232 |
| 6,643,259 B1 | * | 11/2003 | Borella et al. | 370/231 |

FOREIGN PATENT DOCUMENTS

EP          0430570 B1   *   2/1996

* cited by examiner

*Primary Examiner*—Patrice Winder

(57) ABSTRACT

A network system and method of managing a pool of network buffers to allocate or distribute the same among network connections in a manner which maximizes data throughput within the system is disclosed. The system and method employ a buffer manager which monitors the distribution of all buffers within the pool of network buffers and dynamically redistributes buffers to those applications and network connections which have higher data volumes and therefore a greater need for additional buffers. By reallocating buffers for use by those applications and network connections that require large amounts of data, the system throughput can be dramatically improved. The method is also adapted to distribute greater numbers of buffers to network connections that have a higher priority value.

28 Claims, 11 Drawing Sheets

SYSTEM AND METHOD OF MANAGING NETWORK BUFFERS

The present invention generally relates to computer software and more particularly to a system and method of managing network buffers for distribution among one or more applications and a plurality of network connections.

It is not uncommon for a computer server, such as a print server or a web server that is employed in a large area network that may include the Internet, to service large numbers of network connections. In the case of a print server or a web server, it may be necessary to service hundreds, if not thousands of network connections that may be simultaneously active. A system that is servicing such large numbers of network connections must employ network buffers which are generally associated with a server and which are typically fixed in number. As discussed herein a network buffer is defined as a series of bytes the length of current network maximum segment size and is used to both receive network data as well as move that data to its eventual destination.

Distributing buffers to each connection can become problematical due to the fact that some network connections may be sending very high volumes of data whereas others may not. If a network connection, which may be a computer terminal that sends a print job, for example, to a print server, such print jobs may comprise several megabytes of data, whereas sending an e-mail message may require only 5,000 bytes of data. As is known to those of ordinary skill in the art, distributing buffers among the network connections and applications is an important consideration in efficiently servicing the network connections during operation. Since there are typically only a finite number of network buffers that must be distributed among all network connections, there are usually not enough buffers in the pool of network buffers to distribute a large number of them to each network connection and/or application. If a network connection or an application are ones that frequently process large volumes of data, then it is desirable that a larger number of buffers be given to that network connection or application to efficiently handle the tasks that are being carried out. If there are a sufficient number of network buffers given to a high volume network connection or a high volume application, then the throughput of that connection and the system may be dramatically increased. Conversely, if a network connection typically involves a low data volume task, such as e-mails, for example, then there is no need to provide a large number of network buffers to such a network connection and a bare minimum of buffers may be completely adequate to service such network connections. If that is the case, then other network buffers can be available for use by higher data volume connections.

In the past, distribution of network buffers that are fixed in number have been made generally using one of two strategies. In one strategy, the buffers were distributed in random fashion based on whatever network connection requested them first. Although this is a simple solution, it leads to starvation among connections, especially those that are not particularly active. There is also the highly undesirable problem where a single network connection can virtually starve the entire system. A second strategy involves assigning the buffers relatively evenly to network connections regardless of the amount of activity that occurs on the connections. This insures that each connection will always have some buffers in the event of increased need. However, the problem with this solution is that a connection that requires a large number of buffers to achieve desirable throughput is unable to obtain them because they are dedicated to other connections.

Accordingly, it is a primary object of the present invention to provide an improved system and a method of managing network buffers in a manner whereby dynamic redistribution is performed for the purpose of distributing network buffers to those network connections which need them.

A related object of the present invention is to provide an improved system and method for managing network buffers which dynamically distributes buffers so that network connections that require maximum throughput are given as many buffers as possible, while all active connections are given a minimal number of buffers to insure minimal throughput.

Still another object is to provide such an improved system and method that continually evaluates the activity on network connections and dynamically distributes the buffers to network connections, by monitoring every network buffer in the pool of buffers to determine its status and availability.

Another related object lies in the provision of distributing a minimum number of network buffers to each network connection that is resident on a system, provided there are buffers available to do so, with each connection being limited to an initial number of buffers that have been distributed to thereby prevent a single connection from hogging all buffers. However, the number of buffers per connection can be redistributed in accordance with need and availability, taking into consideration the total number of buffers in the pool.

Still another object of the present invention is to provide such an improved system and method which uses a standard interface call to regulate the size of the frontplane interface to distribute the maximum number of buffers among network connections.

These and other objects of the present invention will become apparent upon reading the following detailed description while referring to the attached drawings.

SUMMARY OF THE INVENTION

The present invention comprises a system and method of managing a pool of network buffers to allocate or distribute the same among network connections in a manner which maximizes data throughput within the system is disclosed. The system and method employ a buffer manager which monitors the distribution of all buffers from the pool of network buffers and dynamically redistributes buffers to those applications and network connections which have higher data volumes and therefore a greater need for additional buffers. By reallocating buffers for use by those applications and network connections that require large amounts of data, the system throughput can be dramatically improved. It does this by attributing a higher priority value to the connection.

DETAILED DESCRIPTION

Broadly stated, the present invention is directed to a system and a method of managing a pool of network buffers in a large scale network, that can include the Internet to provide efficient use of the buffers and to attempt to optimize throughput of data through the network. By monitoring the status and use of all of the network buffers, the system and method is able to detect when individual network buffers can be redistributed among all connections according to need. The manner in which this is carried out is described in connection with FIGS. 5–11, which reflect the operation of the system and method during the release process.

Figure 1:
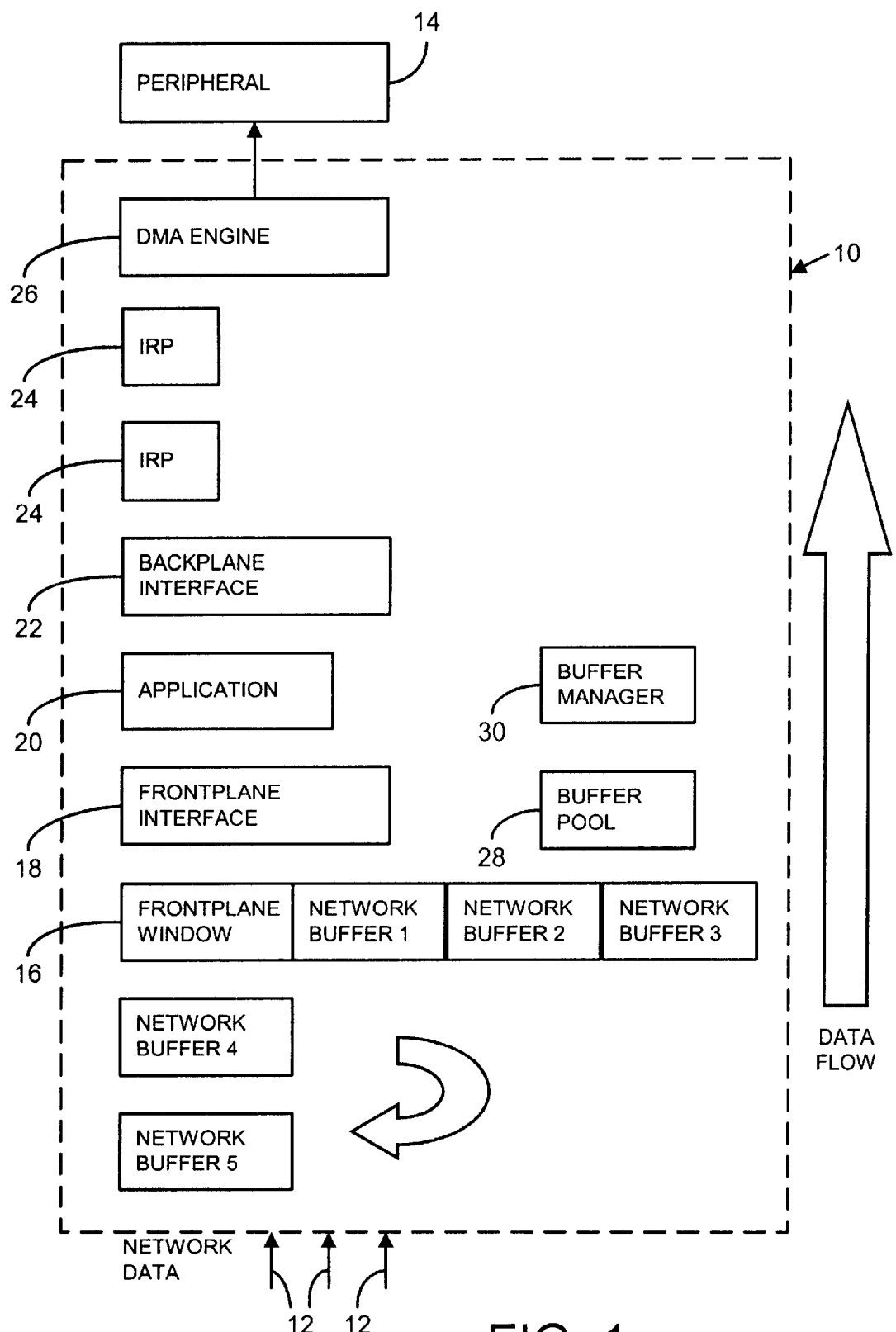
FIG. 1 is a drawing of a system connected to receive data over a network and to provide data to a peripheral device, with the system being illustrated with software modules and buffers in a functional, operational manner. This figure particularly illustrates the network buffers that exceed the window size for a given connection are released back into the pool resulting in data being lost until subsequently retransmitted.

Turning to the drawings, and particularly FIG. 1, it illustrates a system, indicated generally at 10 which is adapted to receive data from one or more inputs 12 and provides data to a peripheral device 14 such as a printer, plotter or streaming media player. Within the system 10 are various modules and components that include a frontplane window 16 shown together with the numbered network buffers, a frontplane interface 18, such as BSD sockets, an application 20, a backplane interface 22, two IO Request Packets (IRP) 24 and a DMA Engine module 26.

With respect to a broad overview of how the present invention moves buffers through the system, when data is read from the network, it is placed into system network buffers. These buffers come from a system pool 28 and are distributed among all active network connections, i.e., devices on the network which generate the data that is on inputs 12. Network buffers are not copied into application 20 buffers but rather flow though the entire system through the use of pointers until they are sent by the DMA engine 26 to the peripheral 14. This results in significant throughput improvement compared to copying the content of buffers. The buffers are unavailable to the rest of the system during the time they are moving through the frontplane window 16, the frontplane interface 18, the application 20, the backplane interface 22, the IRP's 24 and the DMA engine 26. After data is placed into the network buffers from the network, the network buffers are placed in the frontplane window 16, which has a predetermined but variable size. Buffers that do not fit into this window 16 are immediately discarded. However, reliable stream protocols such as TCP will retransmit any dropped data.

For the purposes of the present invention, and as used herein, the terms 'write' and 'writing' mean, in addition to the usual transfer of data into a memory or the like, the action of releasing or giving up ownership of a buffer containing the data through the use of pointers. Similarly, the terms 'read' and 'reading' mean, in addition to the usual accessing data address locations in a memory and acquiring the data from them, the action of acquiring or obtaining data by using pointers to acquire buffers containing the data. Thus, reading data from a frontplane window and writing to an application can be accomplished by using pointers for a buffer so that it is given up by the frontplane window and acquired by the application.

As shown in FIG. 1, Data from the network is applied to inputs 12 and is placed in network buffers. These buffers fill up the front plane window 16. The frontplane window is shown to have three network buffers, which is an example maximum size of the frontplane window. However, it should be understood that a greater or fewer number of buffers may be the maximum. Once this window is full, additional incoming buffers are released immediately back into the system, i.e., the buffer pool 28, until there is room in the window 16 again. The application 20 then does a read on the frontplane interface 18, which will both get the data and clear the window. The window 16 can then hold more network buffers.

Figure 2:
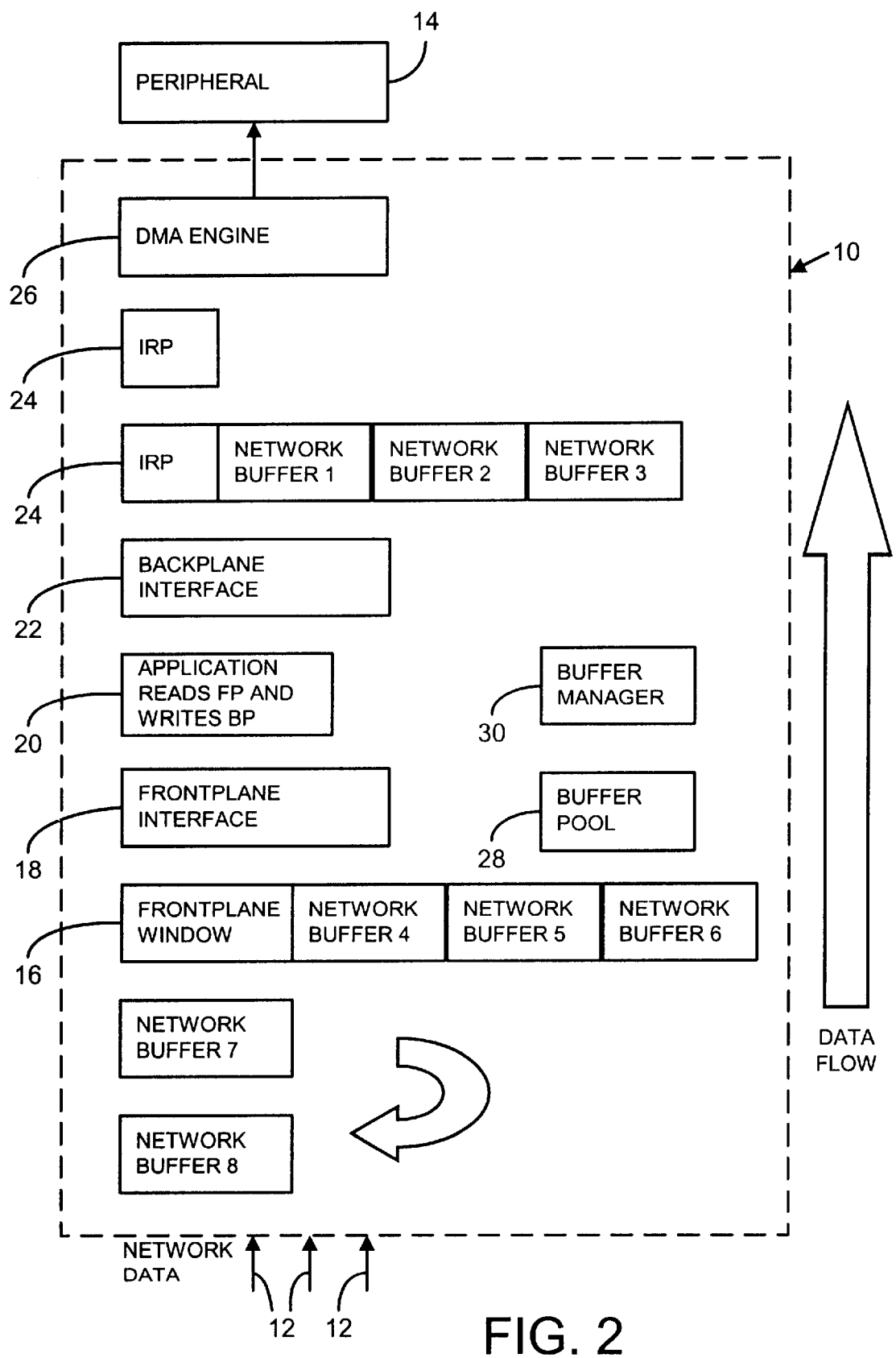
FIG. 2 is similar to FIG. 1, but particularly illustrates the allocation of buffers for an IRP and the relationship of IRP's to the frontplane window.

In the example shown in FIG. 2, the application 20 waits until it can write to the backplane interface 18. Each write to the backplane interface 22 is associated with an IRP. In this system, the IRPs are used as flow control through the backplane interface since an IRP must be available, i.e., empty, in the backplane interface for data to be written there. However, other flow control means can be used. There are a fixed number of IRPs per connection, which is two in the example of FIG. 2. If an IRP is empty, then the application 20 can write. As shown, there is an IRP available so the application does a read from the frontplane interface 18 and a write to the backplane interface 22. The written data is then associated with an IRP in the backplane interface 22. Since the front plane window 16 now has room again, it can begin to fill up with data from the network. In the preferred embodiment, the application 20 obtains all the data in the frontplane window 18 on each read.

Figure 3:
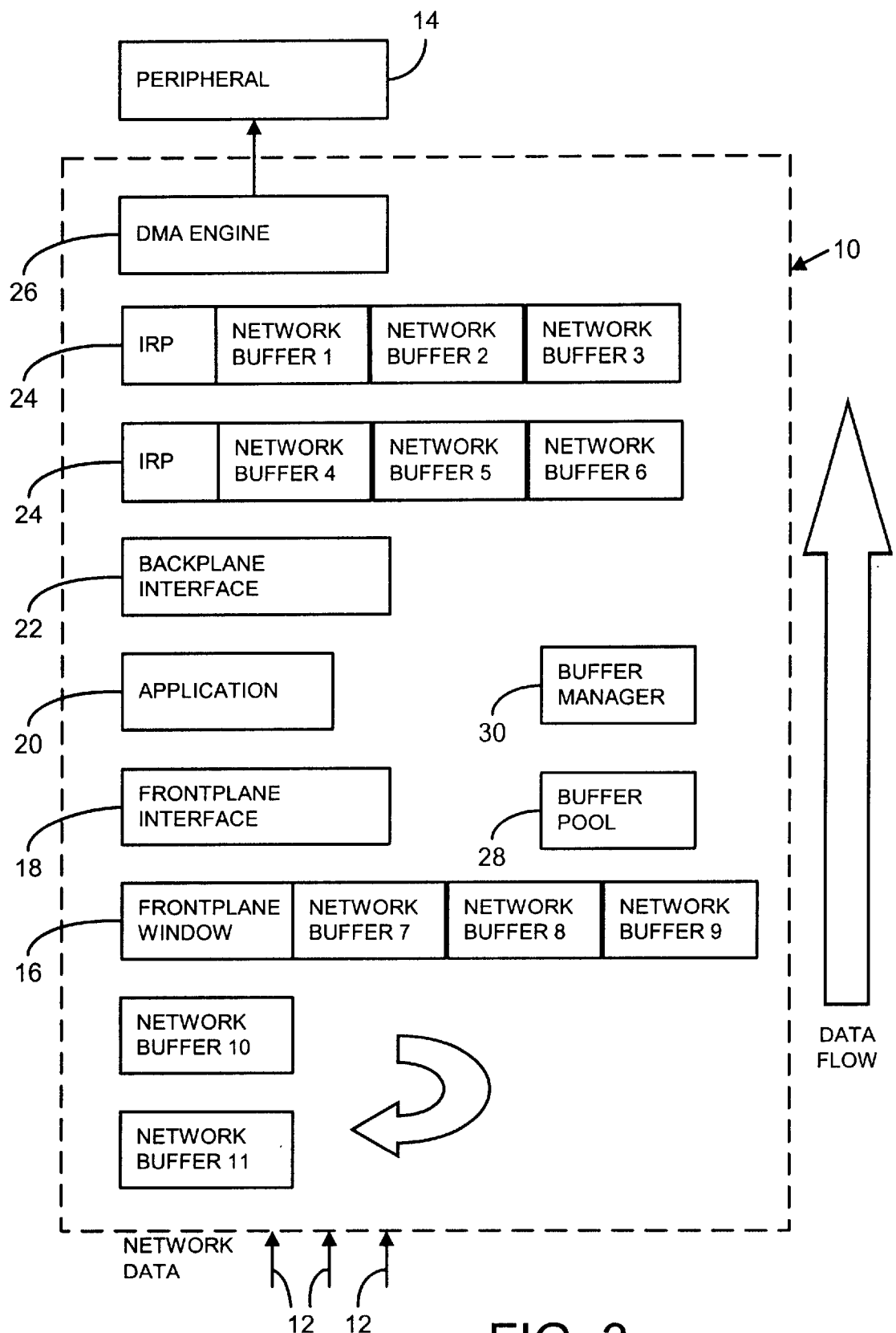
FIG. 3 is similar to FIG. 1 and illustrates another example where there are two IRP's and the relationship of the IRP's to the front plane window buffer operation.

In the example shown in FIG. 3, there are two IRPs in the backplane interface 22 for this network connection, so even if no DMA engine 26 data transfer takes place on the data just written, the application 20 can still write to the backplane interface 22. In this case, the next set of buffers is attached to the remaining IRP and the frontplane window 16 can fill up again. Once again, when the window 16 is full, buffers will be return to the buffer pool 28 immediately with their contents discarded. At this point the front plane 16 is saturated on the device. There are no longer any IRPs available in the backplane interface 22 and so the application 20 is unable to write. Since it cannot write, it will not read from the frontplane interface 18 either so the frontplane window 16 will stay full. Since the frontplane window 16 stays full, all other data coming in on that connection will be discarded. In this example, this network connection can use a maximum of nine network buffers at once.

Figure 4:
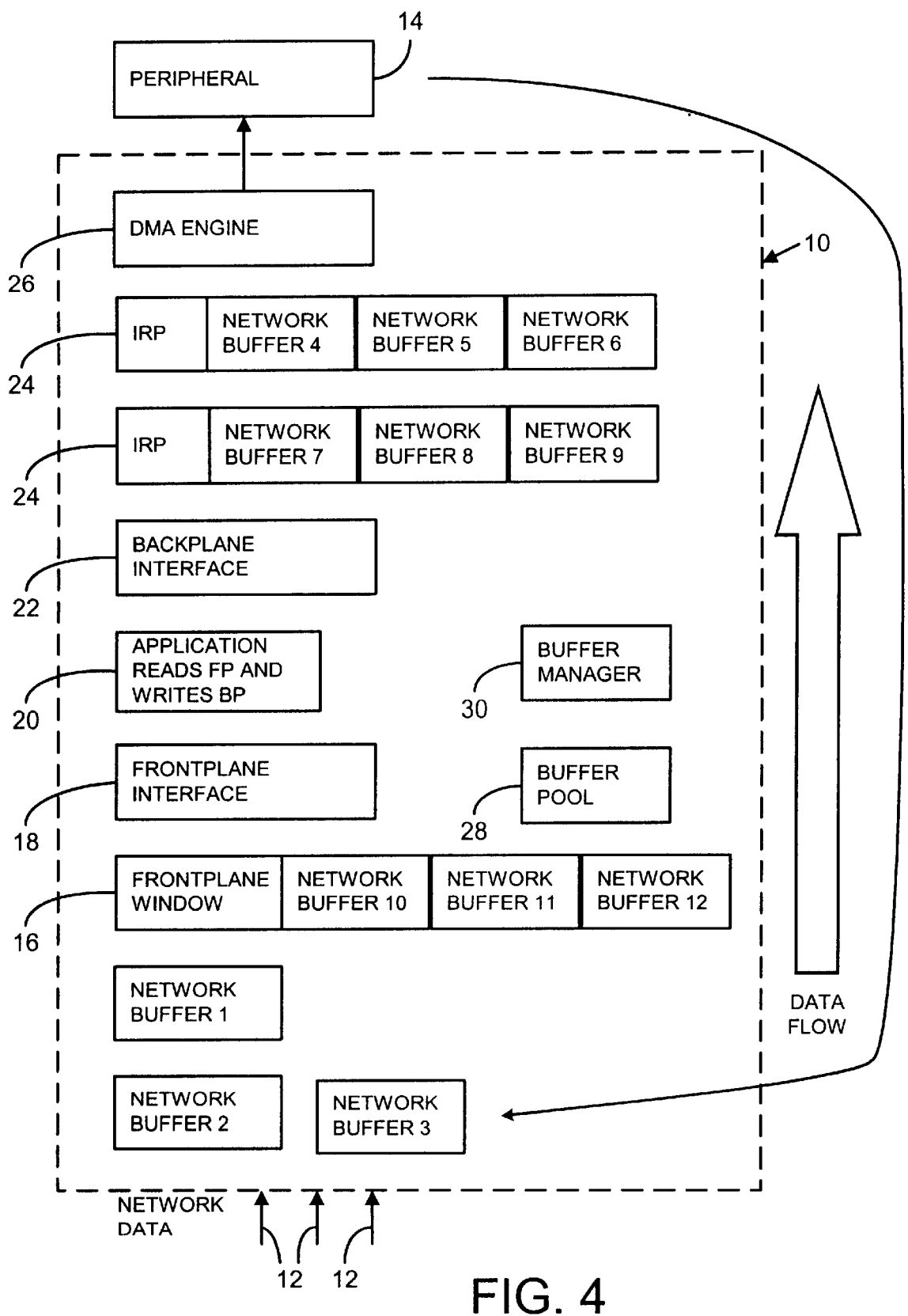
FIG. 4 is similar to FIG. 1, and particularly illustrates the releasing of buffers back into the system after writing of IRP's buffers to the peripheral device; and, FIGS. 5–11 are similar to FIG. 1 and particularly illustrate the methodology of recovering buffers utilizing the present invention.

Referring to the example shown in FIG. 4, once the DMA engine 26 transfer occurs, the buffers are then released back into the buffer pool 28. At this point, an IRP becomes available again and the application 20 is able to write to the backplane interface 22. It once again does a read, freeing up frontplane window space and the process continues. It should be noted that IRPs do not have a buffer limitation since they do not provide the buffers directly. Once IRPs receive the buffers, they just point to them.

In accordance with an important aspect of the present invention, the real limitation is the size of the frontplane window 16 since that determines the size of the frontplane read and backplane write and ultimately the number of buffers that the network connection can have in use simultaneously. Therefore, the total number of buffers that a connection is using can be controlled using the frontplane window size.

By observing the behavior of the example shown in FIG. 4, the buffer usage can be regulated in the application 20 by controlling the size of the frontplane window 18. There is a standard way of doing this when using BSD Sockets API which is preferred. This not only allows portability across a wide variety of systems, but it also regulates system network resources of an application by using common application layer interfaces rather than specialized kernel calls. Using the above diagrams as a source for system behavior, network buffer use can be tracked and regulated algorithmically and then altered with frontplane window size adjustments by following the above rules and assuming the worst case (maximum network buffer use) in all calculations. The buffer manager 30 can then decide dynamically how to best distribute a fixed amount of total buffers among all active connections.

The system and method embodying the present invention distributes a fixed number of network buffers among all active endpoints using the frontplane window size. This differs from the more traditional approach of dedicating a fixed number of buffers for each network connection by distributing buffers dynamically. An endpoint is equivalent to a network connection together with a backplane connection, and is also equivalent to an entry in the software listing. It should be appreciated that there are applications that do not forward data to a peripheral and therefore there may not be an associated backplane interface. In that scenario, an endpoint would not include a backplane connection.

The present invention distributes the buffers by making the size of the frontplane window 16 of each connection available each iteration. Regulating this window 16 prevents network buffers from being used in direct proportion to the amount of real data in those buffers. Since the front plane window size and buffer use are equivalent only if its buffers are full, it is possible to receive smaller packets off the network (packets that are smaller than a full network buffer) and therefore reducing the byte size of the window has less impact on the actual buffer usage. This assumes that applications are trying to be optimal in the way they send data across the network and therefore network buffers will predominately be full.

In accordance with another important aspect of the present invention, a buffer manager module 30 calculates the distribution of buffers so that connections can query for their frontplane window 16 size. The buffer manager 30 neither knows nor cares the impact of its distribution determination. The buffer manager 30 simply tracks the number of buffers assigned to each endpoint that registers and redistributes buffers according to activity, the availability of buffers, and potential residual credits that determine when buffers may be given or taken away. The network connection itself is then responsible for querying the buffer manager 30 each iteration to determine the current size of its frontplane window 16 and setting it accordingly. The buffer manager 30 must mimic algorithmically the behavior of both the frontplane interface 18 and the backplane interface 22 to correctly determine distributions. The buffer manager 30 can only distribute those buffers which it determines are available or which can be acquired from other endpoints. Even though the manager may wish to give a predetermined number of buffers to a particular connection, it may not be able to give that number of buffers to the connection during any given iteration if there are not a sufficient number of buffers available. As used herein, 'assigning' a buffer is equivalent to the recipient acquiring the buffer, i.e., that buffer is available to be used by the recipient upon assignment.

A credit is defined as a unit of buffers. Credits may vary in the number of buffers they contain but not in number in the general case. The total number of credits that an endpoint uses is counted by the number of backplane writes that an application can do before blocking (in the above examples, this is the number of IRPs allocated to a backplane write channel) plus one more for the frontplane window. In the example shown in FIG. 4, at the saturation point of a full frontplane window and two IRPs in the backplane interface, each holding a frontplane window's worth of buffers, for a total of three credits.

Endpoint Priority is defined as High or Normal as determined by a priority select module that is not, in and of itself, a part of the present invention. Priority Select is the module that attempts to query descriptors efficiently giving priority to those that are likely to have activity. This module also determines the current priority of an endpoint based on the priority of the endpoint's descriptors. The manner in which priority values are determined is set forth in U.S. Pat. No. 6,647,441 entitled "Method of Maximizing Servicing Capability of Large Numbers of I/O Descriptors" which is assigned to the same assignee as the present invention. As set forth therein, priority levels are assigned based upon the amount of activity that is experienced by individual descriptors and the priority value is dynamically adjusted to correspond to the amount of activity. The above referred to patent application is specifically incorporated by reference herein.

A Priority List is a group of endpoints with a certain Endpoint Priority. The buffer manager 30 has four priority lists that an endpoint can belong to and an implied list of no priority that is used by endpoints that have no need of buffer distribution (loopback endpoints for example). The terms Locked and Specific are also priorities, but these are not determined by the priority select module. The priorities are defined as follows:

High: This means that the buffer manager 30 will attempt to give endpoints in this list as many extra buffers as possible once the minimal demands of all the endpoints have been met.

Locked: Endpoints in this list are generally datagram endpoints and use a slightly different distribution method since datagrams cannot be throttled and must be written to the backplane in potentially smaller sizes than read in from the frontplane.

Specific: These endpoints have specific needs that determine a certain number of buffers. For example, listening endpoints need to have a buffer for each connection that has been forwarded to the peripheral as an incoming connection plus one more for the next incoming connection (since once a connection is forwarded to the peripheral, a buffer's worth of data can be sitting in the stack).

Normal: These endpoints are given the minimum number of buffers to function as a stream endpoint. Usually one buffer per credit.

None: These endpoints have no restriction on their buffer usage since none of their buffers originate from the frontplane window 16. These buffers are used by loopback connections.

Endpoints or network connections must acquire network buffers before they can do certain operations. If the buffers are not immediately available, then the buffer manager 30 attempts to redistribute buffers to make them available. If there are still no buffers available after redistribution, then the endpoint is not allowed to perform the operation until buffers do become available through termination of other endpoints.

Datagram endpoints will start with a window size of zero until they acquire the minimum buffers for each credit. While their window size is zero, they will be unable to receive data.

A listening stream endpoint (one that receives connections) must acquire one buffer prior to accepting a connection because once a connection is accepted, it is possible for the frontplane window to immediately fill in the worst case. If the peripheral then accepts the connection, the minimum network buffers for each credit must then be acquired for data transfer to take place. The listening endpoint must set its window size to one buffer size once it has acquired the first buffer and must keep it at one no matter how many buffers it ultimately acquires. The strategy here is that each acquired buffer will be surrendered to the endpoint that ultimately has the connection. In BSD sockets, the default size of one buffer is inherited by the accepting connection and therefore insures that any filled window is accounted for.

A connecting stream endpoint must acquire one buffer since a connected endpoint's frontplane window may fill immediately and then one buffer for each credit prior to allowing data transfer.

A loopback endpoint must also acquire a minimum of one buffer per credit however, it always receives its buffers immediately since it bypasses any restrictions.

The buffer manager 30 attempts to satisfy the minimum buffers required for all endpoints. If there are any buffers left over, then it attempts to give those buffers to high priority endpoints in increments of the number of credits that the endpoint has. When all endpoints are serviced, a redistribution is calculated based on the current needs of each endpoint. The endpoint then queries the buffer manager 30 to determine the number of buffers in a credit and adjusts its frontplane window 16 size to this amount. If the window size is increased, then the endpoint can receive more data at a time and realize greater throughput. If the window size is decreased, then the total number of network buffers the endpoint may be using is reduced and the buffer manager 30 can use those buffers for more needy endpoints or for endpoints that still need to satisfy their minimum requirements. Endpoints may move from normal priority to high priority or high priority to normal priority based on a determination from the priority select module. If an endpoint is moved to the high priority, the buffer manager 30 redistributes the extra buffers to give it more buffers in an amount equal to a multiple of the total number of credits.

If the endpoint drops from high priority to normal priority, the buffer manager attempts to recover the extra buffers and reduce the total to the minimum. It is essential that the backplane descriptor be available for writing to release any buffers. This means that data must be flowing somewhere in the system for buffers to be redistributed. Locked endpoints to not acquire or reduce buffers is not based on a determination of the buffer manager 30 but rather on external requests for specific buffers. The number of buffers for locked endpoints is fixed globally by an external request and locked endpoints hold on to all their buffers until the next external request. When Locked endpoints reduce their buffers, they must release one buffer each cycle since only one buffer's worth of data can be written at a time. Endpoints with specific priority also only release buffers on external events but these buffers are typically released by immediately giving them to another endpoint or may not be released at all.

Recovering buffers from formerly high priority endpoints requires that the buffer manager 30 always assume that each credit has a full allotment of buffers and that those buffers are full of data (worst case scenario). The following steps are required for priority high endpoints each time the backplane interface 22 is available for writing:

One less than a credit's worth of buffers can be given up immediately since there is a free IRP (with no associated buffers currently) in the backplane and once that IRP is written to, the frontplane window will have been reduced to the size of one buffer.

Once the window size is reduced, one less than a credit's worth of buffers can be released each time the backplane is once again ready for writing until each credit has the minimum number (usually 1) of buffers associated with it, except for immediately following the initial reduction as explained in the following.

If the frontplane descriptor is ready for reading prior to the frontplane window reduction, then during this distribution, all the buffers will be read from the frontplane window after the window is reduced, guaranteeing that any new data will be restricted to the new window size. This means that the next time the backplane interface 22 is ready for writing (after the read FP write BP transaction), those buffers can be released. However, if the frontplane descriptor is not ready for reading prior to the reduction of the window size, then a race condition exists where the window can fill up just before the reduction occurs. In this case, the buffers cannot be released until a subsequent query is performed on the frontplane descriptor prior to the next distribution. If the window size is reduced and a subsequent query says that the descriptor is not ready for reading, then one less than a credit's worth of buffers can be released since no data is certainly smaller than the reduced window size. If the query says that the descriptor is ready for reading, then the reduction can take place for the same reason as the previous immediate read case. Once it is guaranteed that the window size has restricted the data, then one less than a credits worth of buffers may be released each time the backplane interface descriptor is available for a new write until there only remains one buffer for each credit. At this point, the endpoint has the minimum required buffers for an endpoint to transfer data and the buffer manager 30 has reclaimed all of the high priority buffers.

Figure 5:
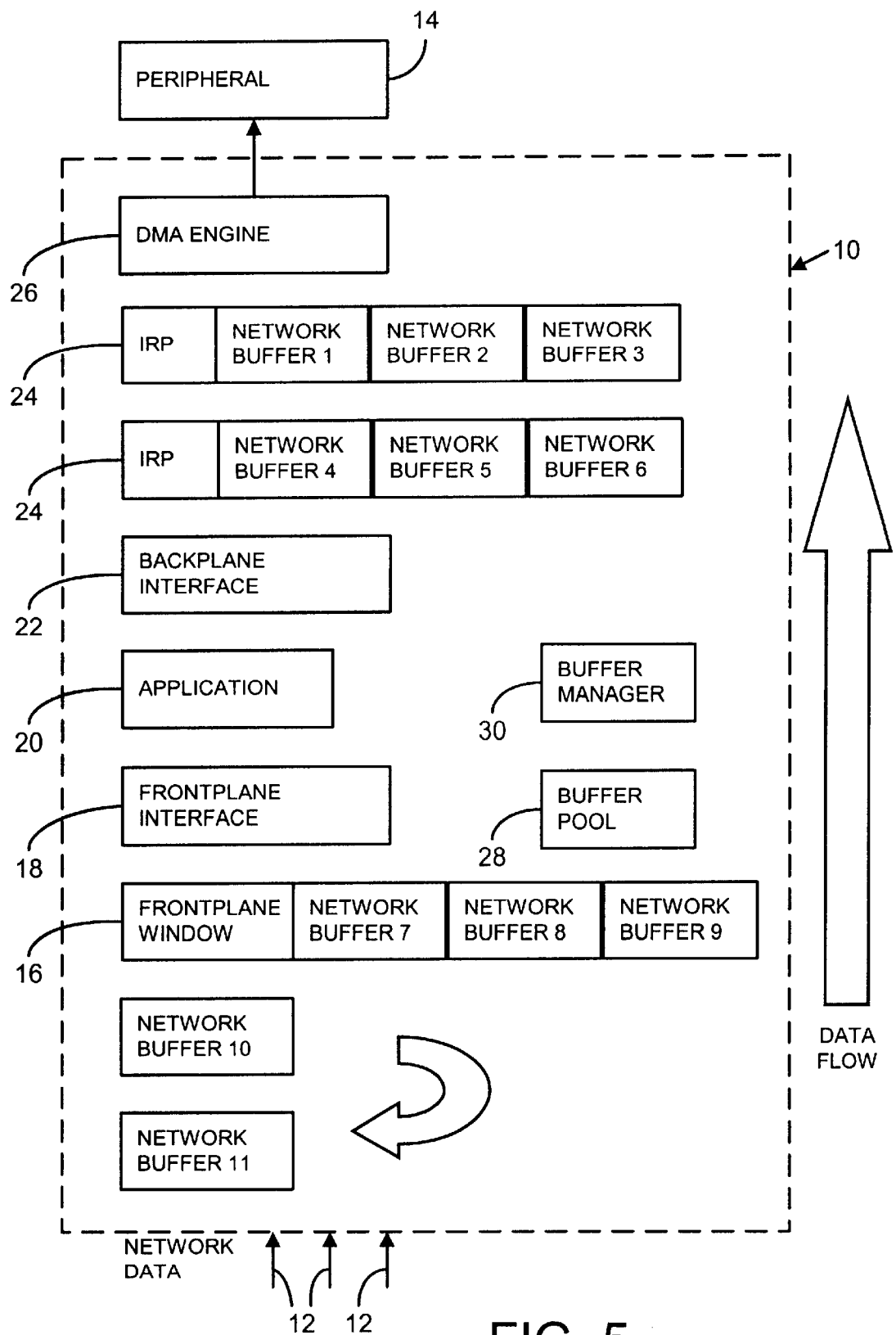

In the following two examples, the methodology for recovering buffers will be shown to illustrate why the buffer manager 30 needs to employ the above algorithm. First, the buffer manager 30 always assumes the worst case which means it behaves as if the network connection is always using the maximum amount of buffers at once. In this case, the network connection has a total of nine buffers at the start of the reduction as shown in FIG. 5. The buffer manager 30 is told that the endpoint is no longer a high use endpoint and the buffer manager 30 wants to recover the extra buffers. The minimal buffers to run is one for each credit, so in this case, three buffers. Therefore, the buffer manager 30 will attempt to recover six buffers. It should be appreciated that the buffer manager 30 must algorithmically mimic what will happen in the following diagrams. The only thing that the buffer manager 30 can do to the connection directly is inform it of what its frontplane window 16 size is and use that to determine the number of buffers that the connection is using. Based on that determination for each connection, it can determine and influence the total distribution of all active connections.

Figure 6:
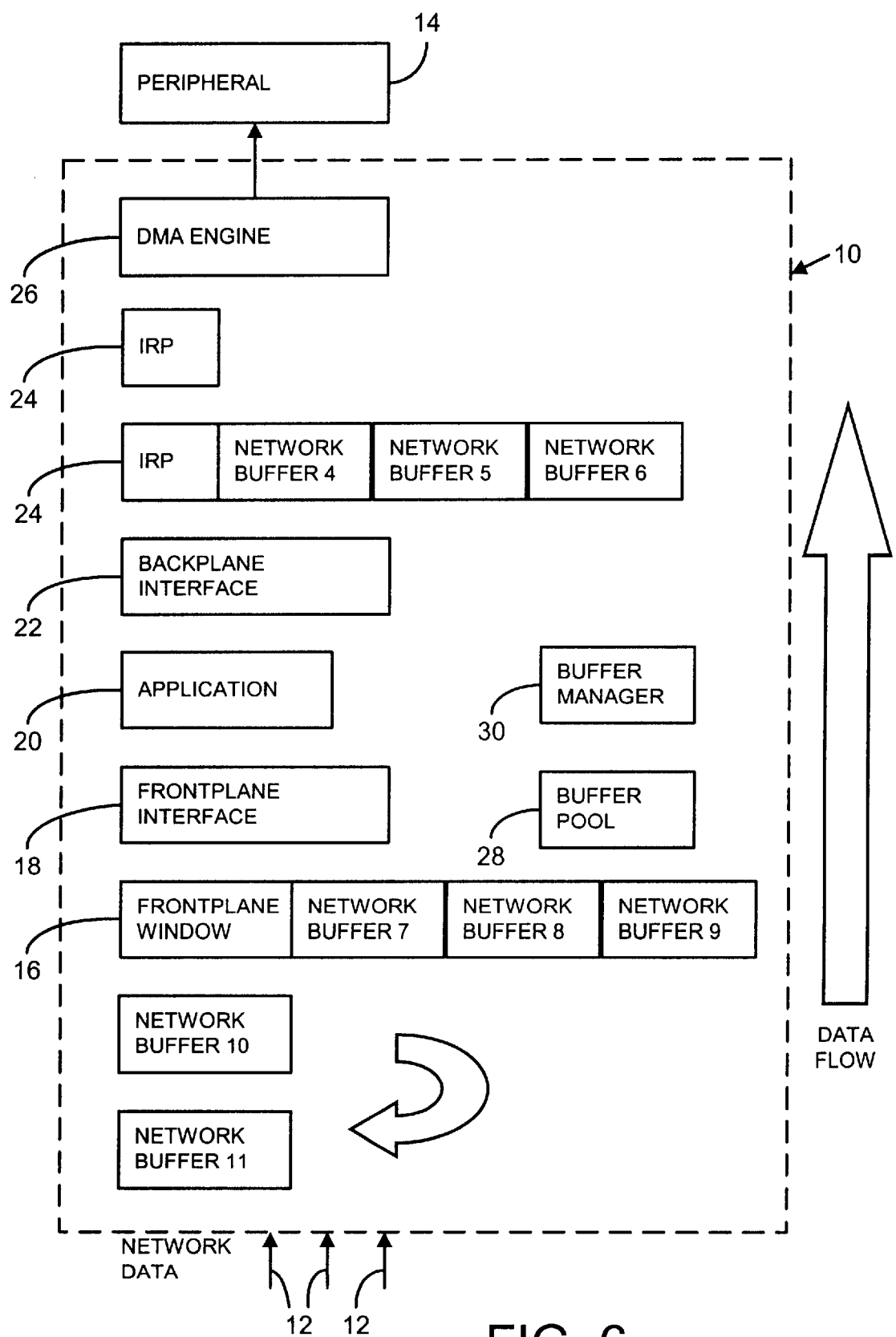
Figure 7:
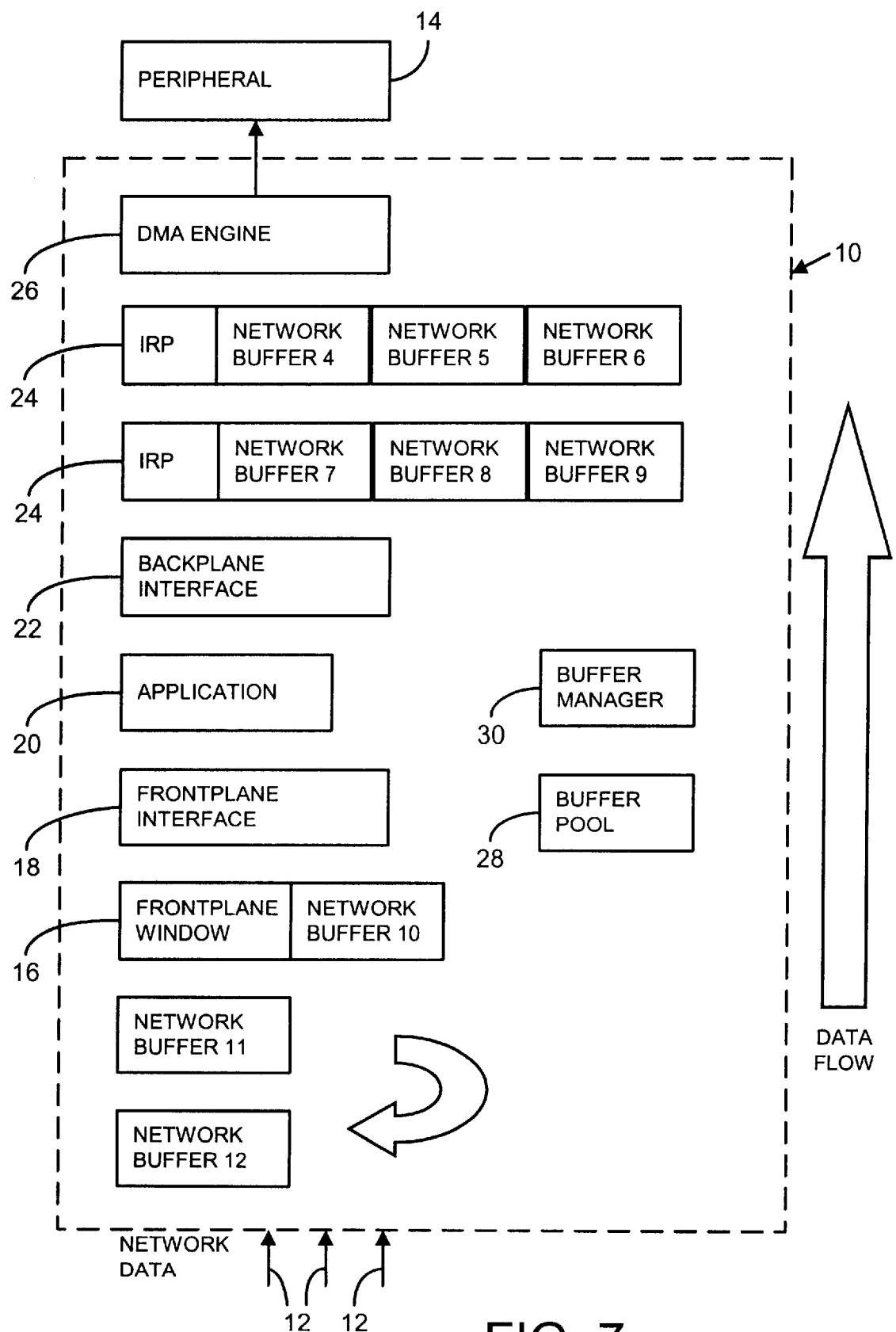

FIGS. 6 and 7 illustrate what happens each time before and after the data transfer and what the buffer manager 30 must mimic algorithmically, starting with a connection that uses its maximum buffers, i.e., the worst case. In the example illustrated in FIG. 5, there are three credits, each with three buffers in use. The buffer manager 30 is told that this connection is no longer high priority so it will attempt to recover two out of the three buffers from each credit by carrying out the following steps:

1. Reduce the window from 3 buffers to 1. This has no effect on the buffers currently in the window however, once these buffers are removed, the window will now only hold one buffer at a time.
2. Check to see if the backplane interface can be written to; in this case, there is an available IRP. When it can, then the buffer manager 30 can immediately recover two buffers because there is at least one IRP that has no data associated with it.
3. If there is no data to be read, then no buffers can be recovered in the next cycle because of a race condition where buffers can fill the window between the time that the read query is made and the window reduction is done. If this happens, the data will not be discovered until the next cycle so a read will not take place on this cycle. If there is data to be read, then a read will take place and will result in the emptying of the frontplane window after the window size reduction has happened.
4. The data will then be read from the frontplane interface 18 if there is any and written to the backplane interface 22.

At this point, the maximum possible number of buffers in use by the connection is 7, which should be the number calculated by the buffer manager as shown in FIG. 7. This state will either be reached on this cycle or the next one depending on whether data was read on the last cycle or not.

In subsequent cycles through the query loop, each time the backplane interface is ready for writing, then the buffer manager 30 can recover two more buffers except for this particular iteration. If the previous loop resulted in a frontplane read, then the two buffers can be recovered. If not, then it is still possible for three network buffers to be in the window even though the window size was reduced to one. In this case no buffers can be recovered until the next iteration. In subsequent cycles through the query loop, each time the backplane interface is ready for writing, then the buffer manager can recover two more buffers until a maximum of six have been recovered as shown in FIGS. 7–11.

Figure 8:
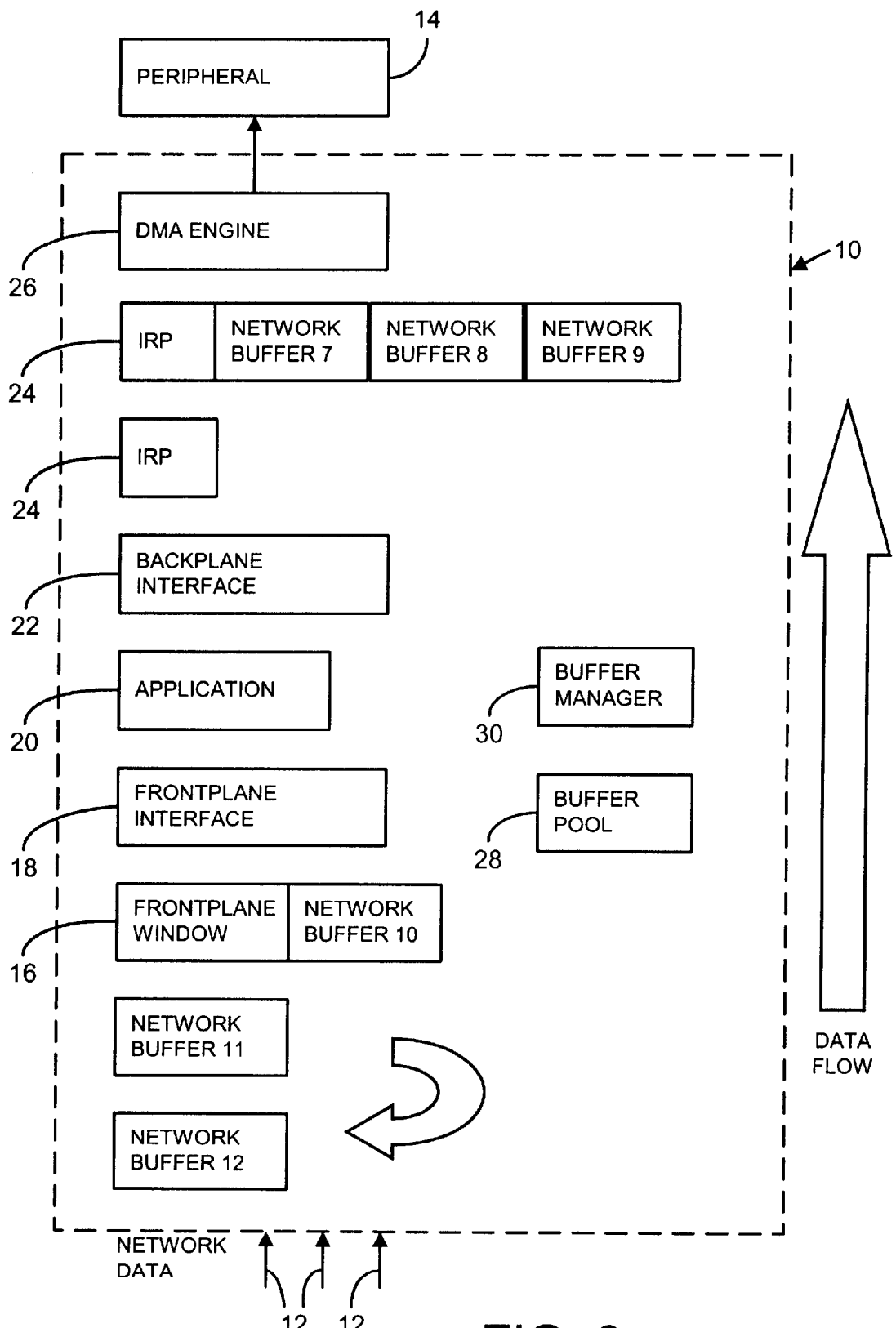

More particularly, FIG. 7 shows the backplane buffers 4 through 9 having been written to, but before a data transfer, and with the frontplane window reduced to one. There are seven buffers in use at this time. After data transfer, there are only buffers 7, 8 and 9 in use and an IRP is available as shown in FIG. 8.

Figure 9:
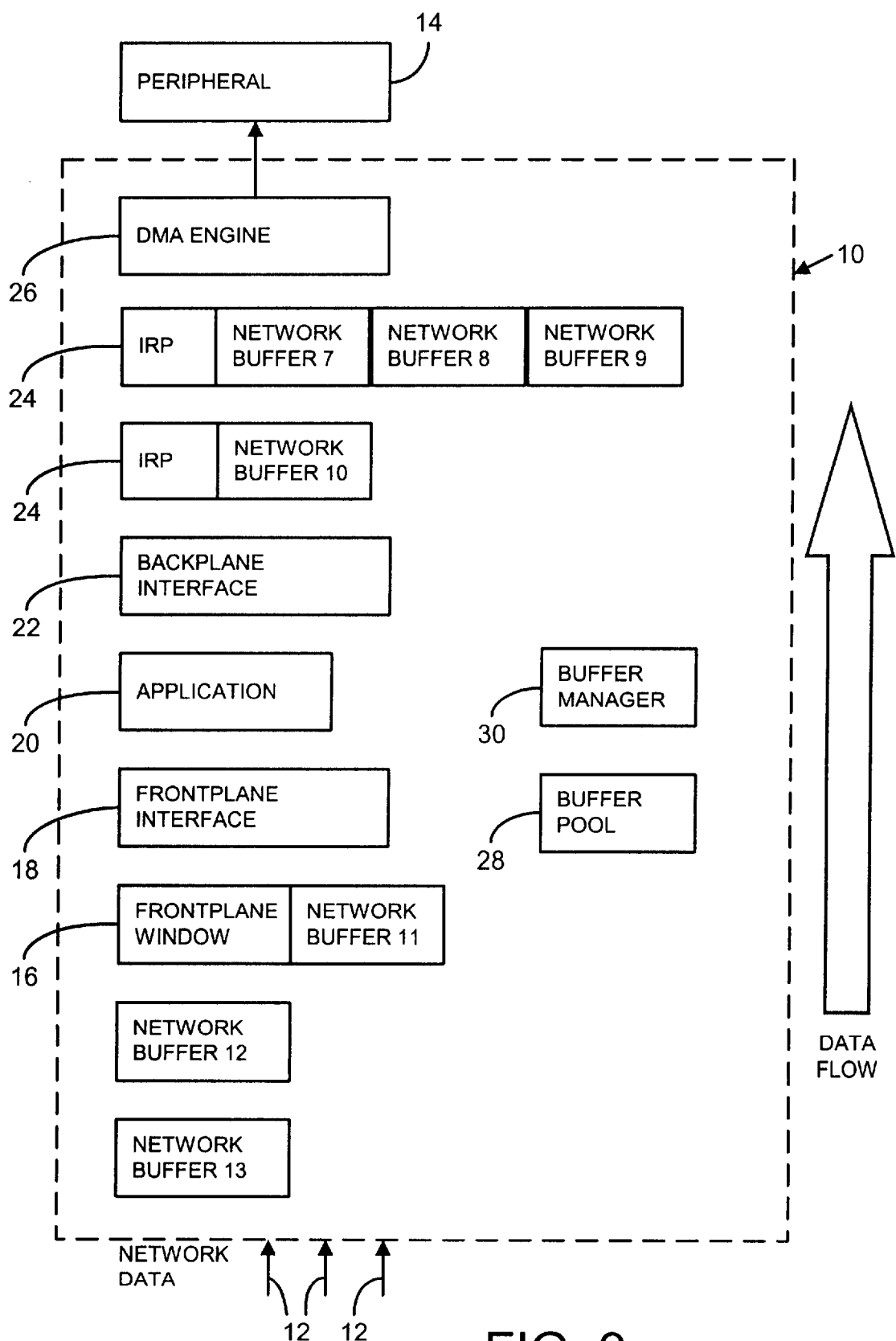
Figure 10:
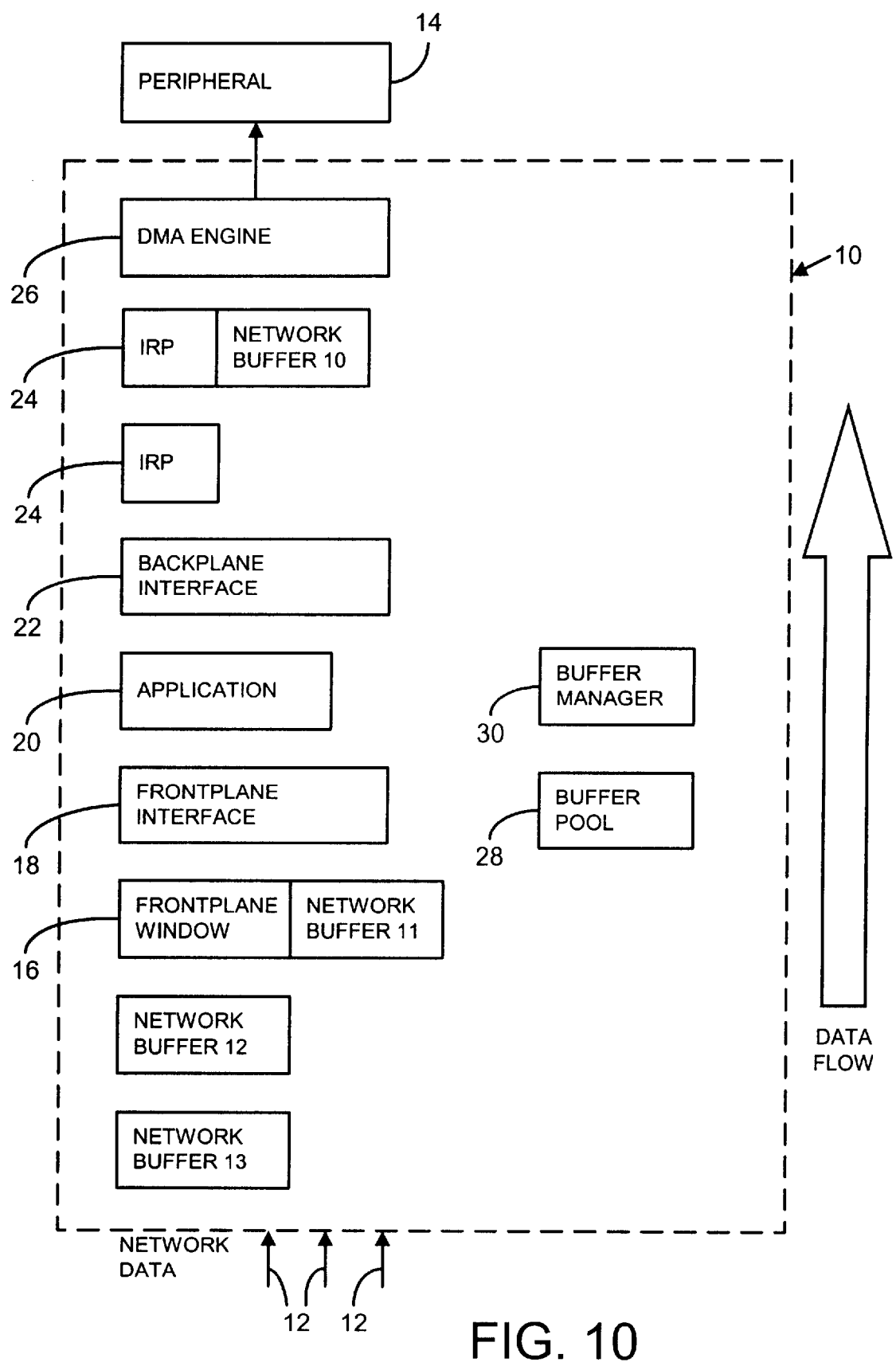
Figure 11:
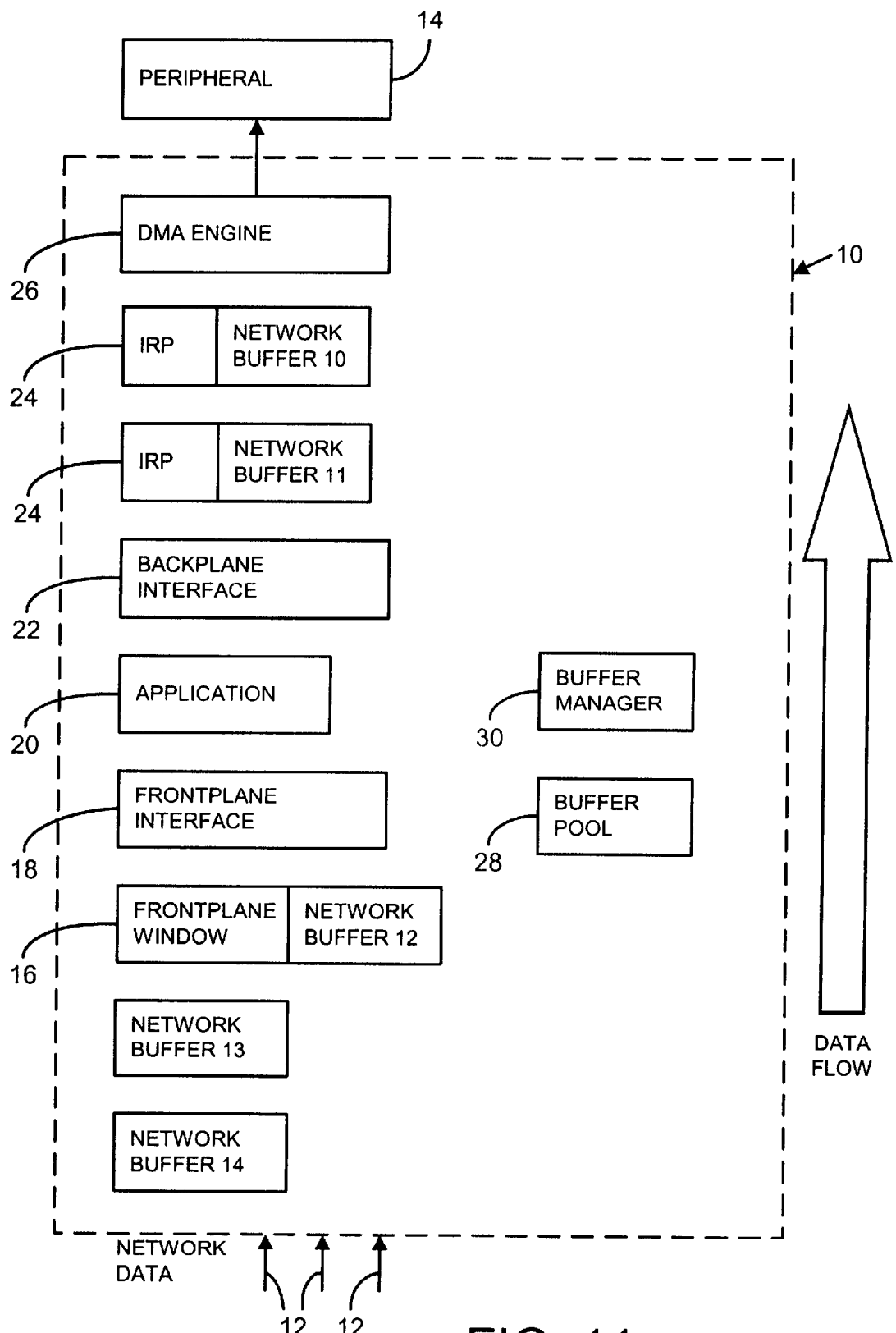

After the frontplane interface 18 read, we can see from FIG. 9 that the maximum buffers still in use by the application has once again dropped by 2 to 5 total. At this point, the buffer manager 30 has calculated the recovery of 4 buffers. Once again, the backplane interface 22 is ready for writing (FIG. 10) so the buffer manager 30 can recover 2 more buffers for a total of 6 recovered buffers (FIG. 11). The remaining buffers that are associated with the network connection is 3. Now again it can be seen in the worst case shown in FIG. 11 that the total buffers in use is 3, which is what the buffer manager should agree with. This is the minimal allocation to accept data and there will be no further recovery from this connection.

The buffer manager 30 is adapted to control the allocation of network buffers based on four priority levels: priority high, priority normal, priority specific and priority locked, as previously mentioned. The following table identifies the priority list entry:

minBuffers—the minimum buffers this entry needs to do anything currentBuffers—the current buffers that the entry has buffersForRelease—total buffers to be released buffersInHolding—spot to hold buffers for one iteration in the event of the race condition releasable—number of buffers that can be released each iteration if there are any creditCount—number of credits this entry has (total possible IRPs+1)

From the foregoing, it should be appreciated that a system and method of managing network buffers has been shown and described which has many advantages and desirable attributes. The invention permits a fixed number of network buffers to be distributed among hundreds if not thousands of network connections and be dynamically reallocated to those network connections which transfer large amounts of data and which need additional buffers in which to efficiently operate. The present invention achieves this end and thereby produces optimum throughput for applications and network connections. Priority Select is the module that attempts to query descriptors efficiently giving priority to those that are likely to have activity. This module also determines the current priority of an endpoint.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

The pseudo code of the algorithm module of the present invention, followed by the C++ class declarations are set forth in the attached Appendix A. It should be understood that languages other than C++, such as Java, for example can be used.

Various features of the invention are set forth in the appended claims.

APPENDIX A

General Algorithm Outline

Focus Is on the Switching between Normal Priority and High Priority

Top Level Query Loop—Loops Permanently

```
Foreach loop iteration
prioritySelect.Select( )
bufferManager.CalculateDistribution
   Foreach Endpoint E
   if E is a new endpoint
      RequestBuffers for E
   else
      DistributeBuffers to E
      E.SetFrontplaneWindow
   Operate on E
   if E has enough buffers, set Fp descriptor and Bp descriptor
   end foreach
```

CalculateDistribution

Calculate total minimum required for all entries in all priorities based on bufferManager.sysMinBuffersPer.
if buffers left over
bufferManager.highPriorityBuffersPer = calculate amount each high priority endpoint will get DistributeBuffers entry.MakeBuffersAvailable // Make any buffers available that the buffer manager is trying to recover
if entry is high priority according to the prioritySelect module
   Move to high priority list if not already there
   if entry.bufferCount < highPriorityBuffersPer
   if enough available buffers
     entry.bufferCount += the difference
   else
   if entry.bufferCount > highPriorityBuffersPer
     entry.ReduceBuffers by the difference else if entry.bufferCount < sysMinBuffersPer
   move to lPriorityNormal list if not already there
   if enough available buffers
     entry.bufferCount += the difference
   else
     if entry.bufferCount > syMinBuffersPer
       entry.ReduceBuffers by the difference ReduceBuffers bufferManager.availableBuffers += One Credit's Worth of Buffer Minus One entry.releasable = buffers per credit - 1 // This represents the number of buffers to be released each
  // time the backplane interface is ready for writing
if a read will be done this iteration
  // place buffer count here to get released the next iteration
  entry.buffersForRelease = Remaining buffers to be released (total credits - 1) * (buffers per credit - 1)
else
// place buffers here to delay the release for an extra iteration. This is for the above mentioned race
  // condition
  entry.buffersInHolding = Remaining buffers to be released.
MakeBuffersAvailable
  if entry can write to the backplane interface
  if entry.buffersForRelease > 0 // there are some buffers to release this iteration
    bufferManager.availableBuffers += entry.releasable
    // release one credit's worth
    entry.buffersForRelease -= entry.releasable
    // Adjust the counters
    entry.buffersForRelease += entry.buffersInHolding
    // We move these buffers to the releasable field
    entry.buffersInHolding = 0
    // This implements our iteration delay
RequestBuffers
  entry.minBuffers = bufferManager.sysMinBuffers
  if bufferManager.availableBuffers > entry.minBuffers
  entry.currentBuffers = entry.minBuffers
  bufferManager.availableBuffers -= entry.minBuffers
  Add entry to lPriorityNormal List
SetFrontplane Window
  Set window size of connection to entry.currentBuffers/ entry.creditCount (buffers per credit)

Class Definitions

The specific definitions of the two interacting classes are set out below. They each have access to each other's data. The BufferManager class is responsible for tracking all the entries that have registered with it. It also tracks all the buffers that are available and is responsible for calculating the distributions and redistributing the buffers. It contains a BufferManagerPriorityList for each priority that is used to track the associated endpoints. It also tracks the maximum buffers in the system, the maximum and minimum buffers an entry can have, the number of credits that each type of entry has, and whether there are any potential buffers in the system that can be released at a later time (for preventing deadlock).

```
class BufferManager
{
    friend class BufferManagerPriorityListEntry;
    // List of entries with High Priority
    BufferManagerPriorityList lPriorityHigh;
    // List of entries with buffers locked
    BufferManagerPriorityList lPriorityLocked;
    // List of entries with Normal (Minimum) Priority
    BufferManagerPriorityList lPriorityNorm;
    // List of entries with specific priority
    BufferManagerPriorityList lPrioritySpecific;
    // Total buffers to work with
    INT32 iSysMaxBuffers;
    // Minimum buffers for an endpoint to run
    INT32 iSysMinBuffersPer;
    // Minimum buffers for a locked endpoint to run
    INT32 iSysMinLockedBuffersPer;
    // This holds a new minimum if the minimum changes
    INT32 iSysNewMinBuffersPer;
    // This holds a new minimum if the locked minimum changes
    INT32 iSysNewMinLockedBuffersPer;
    // Maximum buffers per endpoint
    INT32 iSysMaxBuffersPer;
    // Currently available buffers to distribute
    INT32 iAvailableBuffers;
    // Calculated buffers per high priority endpoint
    INT32 iHighBuffersPer;
    // Number of FP windows that an entry contains
    INT32 iCreditsPer;
    // Number of FP windows that a locked entry contains
    INT32 iLockedCreditsPer;
    // Calculated endpoints getting slightly more
    INT32 iEndpointsGettingExtra;
    // This tracks the buffers that can be released if necessary.
    // It is mainly used as a heuristic to discover if a
    // potential deadlock condition exists and is used to prevent
    // the deadlock.
    INT32 iReleaseBuffers;
    // Method to release buffers synchronously
    BOOL ReduceBufferAllotment(BufferManagerPriorityListEntry*,
            BOOL,INT32,INT32);
    // Methods to distribute buffers to different entry types
    VOID DistributeSpecific(BufferManagerPriorityListEntry*,
            BOOL,BOOL,BOOL);
    VOID DistributeNormal(BufferManagerPriorityListEntry*,
            BOOL,BOOL,BOOL);
    VOID DistributeHigh(BufferManagerPriorityListEntry*,
            BOOL,BOOL,BOOL);
    // Method to drive the buffer release state machine
    VOID MakeBuffersAvailable(BufferManagerPriorityListEntry*,
            BOOL);
    // Method to acquire buffers and determine whether an
    // acquisition took place
    INT32 Eval(BufferManagerPriorityListEntry*);
    // Count the buffers necessary to complete specific minimums
    INT32 CountSpecificBuffers( );
public:
    BufferManager(INT32,INT32,INT32,INT32,INT32,INT32);
    virtual ~BufferManager( );
    BOOL RemoveFromAnyList(BufferManagerPriorityListEntry *pEntry);
    // Method to change the minimum buffers
    INT32 AdjustMinBuffersPer(INT32 iNewMin);
```

-continued

```
INT32 AdjustMinLockedBuffersPer( );
// Method to calculate the new distribution
VOID CalculateDistribution( );
// General distributio method
INT32 DistributeBuffers(BufferManagerPriorityListEntry*,BOOL,
       BOOL,BOOL)
// Request method for minimum buffers
BOOL RequestBuffers(BufferManagerPriorityListEntry*);
// Request for locked buffers
BOOL RequestLockedBuffers(BufferManagerPriorityListEntry*);
// Request method for specific buffers
BOOL RequestBuffers(BufferManagerPriorityListEntry *pEntry,
       INT32 iBuffers,
       INT32 iCreditSize = 0);
// Method to allow one entry to give buffers to another entry
INT32 GiveBuffersFromTo(BufferManagerPriorityListEntry*,
       BufferManagerPriorityListEntry*,
       INT32);
// Method to demand immediate release of a specific number of buffers
INT32 ReleaseBuffers(BufferManagerPriorityListEntry*,INT32);
// Method to demand immediate release of all buffers
INT32 ReleaseAllBuffers(BufferManagerPriorityListEntry*);
// Method to query if the buffermanager might have any buffers
to release
BOOL QueryReleaseBuffers( );
INT32 PreventDeadlock( );
};
```

The BufferManagerPriorityListEntry class tracks an individual entry's resources and responds to external queries about the resources it has. It is also responsible for releasing its buffers appropriately once the buffer manager has determined how many should be released.

```
class BufferManagerPriorityListEntry : public sListEntry
{
    friend class BufferManager;
    // My Buffer Manager
    BufferManager *pBufferManager;
    // Buffers this entry currently can use
    INT32 iCurrentBuffers;
    // Minimum buffers that this entry needs to run
    INT32 iMinBuffers;
    // Buffers that can be released the next iteration
    INT32 iBuffersForRelease;
    // Buffers that can be released when remaining
    // buffers have been successfully DMA'ed
    INT32 iBuffersInHolding;
    // Number of credits
    INT32 iCreditCount;
    // Number of buffers released per credit
    INT32 iReleasable;
    // Window size to report if different from calculated
    INT32 iReportedCreditSize;
protected:
    INT32 RequestBypassBuffers(INT32 iCount);
public:
    BufferManagerPriorityListEntry(UINT32 iOfCreditCount = 1,
                                    UINT32 listCapacity= 1) ;
    virtual ~BufferManagerPriorityListEntry( );
    // Method to enable locking
    BOOL LockCurrentBufferAllocation( );
    // Method to disable locking
    BOOL UnlockCurrentBufferAllocation( );
    BOOL IsLocked( );
    //
    BOOL HasEnoughBuffers(BOOL*);
    INT32 GetBufferCount( );
    INT32 CreditSize( );
};
```

What is claimed is:

1. A method of managing network buffers in a system during receipt of data from a plurality of network connections, the system having a pool of network buffers that are adapted to be distributed among active network connections, the system having a frontplane window for each connection adapted to have a variable assigned number of network buffers, a frontplane interface for receiving data from the assigned network buffers, at least one application using at least one network connection for receiving data from the frontplane interface, a backplane interface for receiving data from the application(s) and for sending the data to a peripheral device, and a buffer manager for controlling the assignment of buffers of the pool of buffers among the network connections, said method comprising the steps of:

assigning a predetermined number of buffers to each frontplane window for each connection, with at least one buffer being assigned to each connection unless a sufficient number of buffers are not available to do so;

the frontplane window receiving data from a connection in the assigned buffers; the frontplane window giving said assigned buffers to the application through the frontplane interface, thereby emptying the window of assigned buffers;

the application acquiring the buffers from the frontplane window through the frontplane interface and writing the same to the backplane interface;

the backplane interface writing said data to the peripheral device, thereby emptying the backplane interface;

the buffer manager monitoring the buffers of the pool that are assigned to connections for the purpose of varying the number of buffers assigned to the frontplane window of each connection to efficiently distribute the buffers so that data throughput for all connections is optimized.

2. A method as defined in claim 1 wherein said buffer manager assigns the predetermined number of buffers to each frontplane window.

3. A method as defined in claim 2 wherein said predetermined number is between 1 and an upper end of said range.

4. A method as defined in claim 1 wherein said step of the backplane interface writing said data comprises the buffer manager allocating a credit, with each credit corresponding to the number of buffers that have been assigned to the frontplane window.

5. A method as defined in claim 4 wherein each credit represents a write operation from the application to an IRP through the backplane interface to the peripheral device, and said writing step simultaneously writes the data for the assigned number of buffers for each credit successively for the number of credits that have been allocated to the connection.

6. A method as defined in claim 1 wherein said buffer manager monitoring the number of buffers from the buffer pool that have been assigned to all connections comprises counting the assigned buffers on a continuing basis, including at least after each writing of data to a peripheral device.

7. A method as defined in claim 1 wherein the step of assigning a predetermined number of buffers to each frontplane window further comprises:

the connection querying the buffer manager as to what the size of its frontplane window is;

the buffer manager responding with a predetermined number of buffers per credit;

the connection setting its frontplane window to allow said predetermined number of assigned buffers.

8. A method as defined in claim 1 wherein the buffer manager monitors the pool of buffers and controls the assigning of buffers for the individual connections as a function of a priority value that is received indicating the amount of activity that is being demonstrated by each connection.

9. A method as defined in claim 8 wherein the buffer manager assigns a larger number of buffers to the frontplane window for those connections which have a higher priority indicating that they are sending larger amounts of data.

10. A method as defined in claim 1 wherein said step of the frontplane window receiving data further comprising such connection receiving data until said data exceeds the capacity of said assigned buffers; in which event the data exceeding the capacity is lost.

11. A method of managing network buffers in a system during receipt of data from a plurality of network connections, the system having a pool of network buffers that are adapted to be distributed among network connections, the system having a frontplane window for each connection adapted to have a variable number of network buffers assigned to each connection, a frontplane interface for receiving data from the assigned network buffers of the frontplane window, at least one application for receiving data from the frontplane interface, a backplane interface for receiving data from the application(s) and providing the data to a peripheral device, and a buffer manager for controlling the assignment of buffers of the pool of buffers among the network connections, said method comprising the steps of:

assigning a predetermined number of available buffers to each frontplane window for each connection, with the number of buffers assigned to each connection varying within a predetermined range;

the frontplane window receiving data from a connection in the assigned buffers for such connection until said data exceeds the capacity of said assigned buffers, in which event the exceeded capacity data is lost;

the frontplane window giving said assigned buffers to the application through the frontplane interface, thereby emptying the frontplane window;

the application reading said data from the frontplane interface and writing the same to the backplane interface;

the backplane interface writing said data to the peripheral device, thereby emptying the backplane interface;

the buffer manager monitoring all buffers of the pool that are assigned to connections, and being adapted to effectively reassign the unassigned buffers to the frontplane windows of those connections which are providing large amounts of data so that the throughput of data from all connections is optimized.

12. A method as defined in claim 11 wherein said buffer manager assigns the predetermined number of buffers to each connection, the connection querying the buffer manager to determine what its frontplane window size is.

13. A method as defined in claim 11 wherein said step of the backplane interface writing said data comprises the buffer manager allocating a credit, with each credit corresponding to the number of buffers that have been assigned to the frontplane window.

14. A method as defined in claim 13 wherein each credit represents a write operation from the backplane interface to the peripheral device, and said writing step simultaneously writes the data for the assigned number of buffers for each credit successively for the number of credits that have been allocated to the connection.

15. A method as defined in claim 11 wherein said buffer manager monitoring the number of buffers from the buffer pool that have been assigned to all connections comprises counting the assigned buffers on a continuing basis, including at least after each writing of data to a peripheral device.

16. A method as defined in claim 11 wherein the step of assigning a predetermined number of buffers to each frontplane window further comprises:

the connection querying the buffer manager as to what number of buffers it should be;

the buffer manager responding with a predetermined number of buffers;

the connection setting. itself to allow said predetermined number of assigned buffers.

17. A method as defined in claim 16 wherein said buffer manager acquires buffers from other connections or uses available buffers for redistribution prior to responding with said predetermined number of buffers.

18. A method as defined in claim 11 wherein the buffer manager monitors the pool of buffers and controls the assigning of buffers for the individual connections as a function of a priority value that is received indicating the amount of activity that is being demonstrated by each connection.

19. A method as defined in claim 18 wherein the buffer manager assigns a larger number of buffers to the frontplane window of connections which have a higher priority indicating that they are sending larger amounts of data.

20. A system for managing network buffers operably connected to a network having a plurality of network connections, with the network connections being adapted to send data on the network, the network including at least one peripheral device adapted to perform a task responsive to receiving data over the network, said system comprising:

a pool of network buffers adapted to be distributed among active network connections;

a frontplane window for each connection having a variable number of network buffers assigned thereto adapted to receive data from a connection, and to write data from said assigned buffers into a frontplane interface, thereby emptying the frontplane window;

a frontplane interface adapted to transfer data from said frontplane window;

at least one application adapted to acquire buffers from said frontplane window via said frontplane interface, process the data in said acquired buffers and write data to a backplane interface;

a backplane interface having a variable number of assigned buffers adapted to receive data from the application(s) and write said data to the peripheral device, thereby emptying the buffers assigned thereto; and, a buffer manager adapted to control the assignment of buffers of the pool of buffers among the network connections, said buffer manager assigning at least one buffer to each frontplane window for each connection, the buffer manager monitoring the buffers of the pool that are assigned to connections, and effectively varying the number of buffers assigned to the frontplane window of each connection to efficiently distribute the buffers so that data throughput for all connections is optimized.

21. A system as defined in claim 20 wherein the number of buffers assigned to said backplane interface for an individual connection is at least as large as the number of buffers assigned to said frontplane buffer.

22. A system as defined in claim 20 wherein said buffer manager allocates a credit to said backplane interface, with each credit corresponding to the number of buffers that have been assigned to said frontplane window for each connection.

23. A system as defined in claim 20 wherein said buffer manager counts the assigned buffers on a continuing basis, including at least after each writing of data to the peripheral device.

24. A system as defined in claim 20 wherein said buffer manager assigns a predetermined number of buffers to each frontplane window responsive to the connection querying the buffer manager as to what number of buffers it should have, the buffer manager responding with a predetermined number of buffers, and the connection setting itself to have said predetermined number of assigned buffers.

25. A system as defined in claim 20 wherein said buffer manager monitors the pool of buffers and controls the assigning of buffers for the individual connections as a function of a priority value that is received indicating the amount of activity that is being demonstrated by each connection.

26. A system as defined in claim 25 wherein said buffer manager assigns a larger number of buffers to the frontplane for those connections which have a higher priority indicating that they are sending larger amounts of data.

27. A system as defined in claim 20 wherein said frontplane window receives data until said data exceeds the capacity of said assigned buffers; in which event the exceeded capacity data is lost.

28. A system for, among other tasks, managing network buffers operably connected to a network having a plurality of network connections, with the network connections being adapted to send data on the network, the network having connected to it, at least one peripheral device adapted to perform a task responsive to receiving data over the network, said system comprising:

a pool of network buffers adapted to be distributed among active network connections;

a frontplane window for each connection having a variable number of network buffers assigned thereto adapted to receive data from a connection, and to write data from said assigned buffers through a frontplane interface to at least one application, thereby emptying said frontplane window;

a frontplane interface adapted to transfer data buffers of said frontplane window to at least one application;

at least one application adapted to receive data from said frontplane interface and process the same, said application being adapted to write data to a backplane interface;

a backplane interface allowing a variable number of assigned buffers adapted to receive data from the application(s) and send said data to the peripheral device, thereby emptying the buffers assigned thereto; and, a buffer manager adapted to control the assignment of buffers of the pool of buffers among the network connections, said buffer manager assigning at least one buffer to each frontplane window for each connection, said buffer manager monitoring all buffers of the pool that are assigned to connections, and being adapted to effectively reassign the unassigned buffers to the frontplane windows of those connections which are providing large amounts of data so that the throughput of data from all connections is optimized.

* * * * *